(12) United States Patent
D'Arienzo

(10) Patent No.: US 11,022,035 B2
(45) Date of Patent: Jun. 1, 2021

(54) COGENERATION SYSTEM FOR A BOILER

(71) Applicant: Giovanni D'Arienzo, Monopoli (IT)

(72) Inventor: Giovanni D'Arienzo, Monopoli (IT)

( * ) Notice: Subject to any disclaimer, the term of this patent is extended or adjusted under 35 U.S.C. 154(b) by 0 days.

(21) Appl. No.: 16/955,692

(22) PCT Filed: Dec. 19, 2018

(86) PCT No.: PCT/IB2018/060325
§ 371 (c)(1),
(2) Date: Jun. 18, 2020

(87) PCT Pub. No.: WO2019/123305
PCT Pub. Date: Jun. 27, 2019

(65) Prior Publication Data
US 2020/0309026 A1 Oct. 1, 2020

(30) Foreign Application Priority Data
Dec. 22, 2017 (IT) .......................... 102017000148827

(51) Int. Cl.
*F02C 1/00* (2006.01)
*F24H 1/00* (2006.01)
(Continued)

(52) U.S. Cl.
CPC ........... *F02C 1/007* (2013.01); *F24H 1/0027* (2013.01); *F24H 1/0072* (2013.01); *F24H 3/12* (2013.01); *F24H 6/00* (2013.01); *H02K 7/1823* (2013.01)

(58) Field of Classification Search
CPC .... F02C 1/007; F02C 1/04; F02C 6/18; F02C 7/08; F24H 1/0027; F24H 1/0072;
(Continued)

(56) References Cited

U.S. PATENT DOCUMENTS 3,965,675 A * 6/1976 Martz ................... F01K 23/108
60/39.182
4,289,475 A * 9/1981 Wall ......................... F23K 5/22
431/11
(Continued)

FOREIGN PATENT DOCUMENTS

CN 103644003 A 3/2014
DE 20220621 U1 12/2003
(Continued)

OTHER PUBLICATIONS

International Search Report issued in connection with PCT Application No. PCT/IB2018/060325 dated Mar. 26, 2019.

*Primary Examiner* — Tulsidas C Patel
*Assistant Examiner* — Joseph Ortega
(74) *Attorney, Agent, or Firm* — Steven M. Shape; Dennemeyer & Associates, LLC

(57) ABSTRACT

Cogeneration system (200, 300) comprising: a boiler (201, 301) able to heat water for domestic use; a combustor (201a, 301a) placed into the boiler; a compressor (204, 304); a heat exchanger (202, 302) for the exchange of thermal energy between the combustion fumes generated in the combustor (201a, 301a) and a fluid coming from the compressor (204, 304); a gas turbine (203, 303); a current generator (205, 305) and a current converter (206, 306) able to produce electrical energy; a main fumes/water exchanger (207, 307) able to recover thermal energy.
The cogeneration system (200, 300) comprises also a by-pass valve (210, 310) configured to adjust the flow of fluid entering the gas turbine (203, 303).

3 Claims, 2 Drawing Sheets

(51) Int. Cl.
*F24H 3/12* (2006.01)
*F24H 6/00* (2006.01)
*H02K 7/18* (2006.01)

(58) Field of Classification Search
CPC .......... F24H 3/12; F24H 6/00; F24H 2240/12; F24H 1/124; H02K 7/1823; Y02E 20/14
See application file for complete search history.

(56) References Cited

U.S. PATENT DOCUMENTS

| | | | | |
|---|---|---|---|---|
| 4,353,206 A * | 10/1982 | Lee | ............ | B01D 53/56 60/39.182 |
| 4,953,512 A * | 9/1990 | Italiano | ............ | F24H 1/0045 122/17.1 |
| 5,059,405 A * | 10/1991 | Watson | ............ | B01D 53/75 423/210 |
| 5,108,717 A * | 4/1992 | Deller | ............ | B01D 53/8662 422/171 |
| 5,384,051 A * | 1/1995 | McGinness | ............ | B01J 3/008 210/761 |
| 5,635,139 A * | 6/1997 | Holst | ............ | B01D 53/8668 122/4 D |
| 5,847,353 A * | 12/1998 | Titus | ............ | C03B 5/02 219/121.36 |
| 5,896,740 A * | 4/1999 | Shouman | ............ | F01K 21/042 60/39.182 |
| 6,126,913 A * | 10/2000 | Martin | ............ | B01J 8/025 423/245.3 |
| 6,393,821 B1 * | 5/2002 | Prabhu | ............ | F02C 3/22 60/39.465 |
| 6,595,001 B2 * | 7/2003 | Rautenbach | ............ | C10L 3/06 60/772 |
| 6,655,137 B1 * | 12/2003 | Sardari | ............ | B01D 53/8668 60/517 |
| 6,748,742 B2 * | 6/2004 | Rouse | ............ | F02C 3/36 60/611 |
| 6,892,542 B2 * | 5/2005 | Voinov | ............ | F02C 3/22 60/39.465 |
| 6,895,760 B2 * | 5/2005 | Kesseli | ............ | F02C 3/20 60/723 |
| 8,671,658 B2 * | 3/2014 | Prabhu | ............ | F23R 3/26 60/39.281 |
| 8,701,413 B2 * | 4/2014 | Prabhu | ............ | F02C 3/22 60/737 |
| 8,893,468 B2 * | 11/2014 | Prabhu | ............ | F01K 13/00 60/39.463 |
| 9,057,028 B2 * | 6/2015 | Prabhu | ............ | C10K 1/101 |
| 9,194,584 B2 * | 11/2015 | Watts | ............ | F23G 7/066 |
| 9,371,993 B2 * | 6/2016 | Armstrong | ............ | F23G 7/066 |
| 9,567,903 B2 * | 2/2017 | Armstrong | ............ | F23G 7/066 |
| 9,683,515 B2 * | 6/2017 | Ernst | ............ | F01K 23/065 |
| 2003/0014959 A1 * | 1/2003 | Ginter | ............ | F02C 3/30 60/39.26 |
| 2004/0058230 A1 * | 3/2004 | Hsu | ............ | H01M 8/2475 429/62 |
| 2005/0022499 A1 * | 2/2005 | Belokon | ............ | F23C 9/00 60/39.511 |
| 2006/0042259 A1 * | 3/2006 | Marushima | ............ | F02C 6/18 60/772 |
| 2008/0115502 A1 * | 5/2008 | Roby | ............ | F23D 11/44 60/783 |
| 2008/0173006 A1 * | 7/2008 | Kataoka | ............ | F02C 9/18 60/39.511 |
| 2010/0139282 A1 * | 6/2010 | Prabhu | ............ | F02C 3/22 60/737 |
| 2010/0275611 A1 * | 11/2010 | Prabhu | ............ | F02C 7/224 60/780 |
| 2010/0319355 A1 * | 12/2010 | Prabhu | ............ | F02C 7/224 60/772 |
| 2011/0219780 A1 * | 9/2011 | Prabhu | ............ | F23K 5/22 60/775 |
| 2012/0000200 A1 * | 1/2012 | Freund | ............ | F01K 25/10 60/645 |
| 2013/0104563 A1 * | 5/2013 | Oelfke | ............ | F02C 7/08 60/773 |
| 2014/0230446 A1 * | 8/2014 | Beutel | ............ | F23G 7/07 60/773 |
| 2014/0250908 A1 * | 9/2014 | Huntington | ............ | F02C 3/20 60/776 |
| 2015/0000244 A1 * | 1/2015 | Thatcher | ............ | B01D 53/78 60/39.5 |
| 2019/0144769 A1 * | 5/2019 | Sakamoto | ............ | C10J 3/46 252/373 |
| 2020/0256218 A1 * | 8/2020 | Kido | ............ | F22G 5/08 |

FOREIGN PATENT DOCUMENTS

| | | |
|---|---|---|
| DE | 102009057100 A1 | 6/2011 |
| DE | 102011111869 A1 | 2/2013 |
| EP | 2420662 A1 | 2/2012 |
| GB | 1309589 A | 3/1973 |
| JP | 2000054855 A | 2/2000 |

* cited by examiner

COGENERATION SYSTEM FOR A BOILER

CROSS-REFERENCE TO RELATED APPLICATIONS

This is a 35 U.S.C. 371 National Stage Patent Application of International Application No. PCT/IB2018/060325, filed Dec. 19, 2018, which claims priority to Italian application 102017000148827, filed Dec. 22, 2017, each of which is hereby incorporated by reference in its entirety.

BACKGROUND

The present invention relates to a cogeneration system for a boiler.

In particular, the present invention relates to a cogeneration system for a boiler, for example for a boiler for domestic use or for a steam-generating boiler.

As it is known, a generic domestic boiler for hot water production uses the combustion of a fuel (liquid or gaseous) with air (oxidizing agent) usually at room temperature (Tamb). In general, in the boiler there is a combustion chamber, thermally insulated, in which is inserted a main exchanger in which the working fluid to be heated, typically water, flows at a temperature ranging between 15° C. and 80° C.

Cogeneration systems applied to boilers such as the one described in the patent application CN105222203, in which is described a heating device having a gas-steam cogeneration system, are known.

However, known cogeneration systems for boiler are not optimized for civil and domestic applications, and are cumbersome and expensive. Moreover, in the known cogeneration systems, once the power supplied through the combustion is fixed, the production of thermal energy is linked to the production of electrical energy, so that their ratio cannot be changed. As a consequence of this restriction if only the part of thermal energy should be increased it would be necessary to increase the supplied energy, and as a result also the production of electrical energy would be increased. In known systems, therefore, the amount of produced thermal energy is bond to the amount of electrical energy being produced.

A solution trying to solve these problems is the patent application DE102009057100, which discloses an electrical energy-heat cogeneration system for small residential units having a gas turbine, a compressor and a generator. The expander of the gas turbine, the compressor and the generator are arranged on a common shaft. The gas for a shaft bearing is brought to a positive pressure through the compressor. The working gas is an inert gas such as helium.

A solution to these problems is described in the patent GB1309589 which reports a process for the utilisation of the energy content of the flue gas accruing in catalytic cracking plants. Energy is recovered from the flue gas arising in the regeneration of catalyst in a cracking plant by supplying the air for regeneration by a compressor, passing the flue gas through a cyclone to a turbine, burning the CO in the gas in a catalytic CO boiler downstream of the turbine, heating excess air from the compressor in the CO boiler, and mixing this heated air with the flue gas upstream of the cyclone. Heat remaining in the flue gases can be used to raise steam, before the gases pass to the chimney.

The problem of this solution is that the produced energy cannot be adjusted and cannot be divided into an electrical part and a thermal part in a variable manner.

The purpose of the present invention is to provide a cogeneration system for a boiler that recovers the heat of the combustion fumes to convert it into electrical energy and into thermal energy allowing to modify according to the needs the ratio between the part to convert into electrical energy and the part aimed at producing thermal energy, this wat keeping fixed the overall yield at its maximum value, so that to overcome the limits of the known technical solutions.

Furthermore, the object of the present invention is to provide a cogeneration system for a boiler that is efficient, economical and not bulky.

Finally, the object of the present invention is to provide a cogeneration system for a boiler which allows the production of thermal energy and, if required, of electrical energy, keeping always fixed the overall yield.

For a better understanding of the present invention, preferred embodiments are described, purely by way of non-limiting examples, with reference to annexed drawings, in which:

FIG. 1 shows a block diagram of a first embodiment of the cogeneration system for a boiler, according to the invention;

FIG. 2 shows a block diagram of a second embodiment of the cogeneration system for a boiler, according to the invention.

With reference to the figures, a system 200, 300 is shown, according to the invention.

The cogeneration system 200, 300 for a boiler comprises: a boiler 201, 301 able to heat water preferably for a domestic use, comprising internally a combustor 201a, 301a of liquid or gaseous fuel; a compressor 204, 304; a heat exchanger 202, 302 for the exchange of thermal energy between the combustion fumes produced by the combustor 201a, 301a and a fluid coming out of the compressor 204, 304; a gas turbine working on a fluid compressed and heated by the heat exchanger 202, 302; a current generator 205, 305 and a current converter 206, 306 connected to the gas turbine 203, 303 able to produce electrical energy; and a main fumes/water exchanger 207, 307, placed after the heat exchanger 202, 302 able to recover the remaining part of the thermal energy produced by the combustion in the combustor 201a, 301a, contained in the combustion fumes and not absorbed by the heat exchanger 202, 302.

The cogeneration system 200, 300, in addition, comprises, before the gas turbine 203, 303, a by-pass valve 210, 310 configured to adjust the part of the flow of the compressed and heated fluid entering the gas turbine 203, 303 and aimed at producing electrical energy. The remaining flow of the fluid, in order to recover the thermal energy contained in it, is mixed with the one coming out of the gas turbine 203, 303 and sent to the heat exchanger 209, 309 in the systems 200, 300.

According to an aspect of the invention, the opening and closing of the by-pass valve 210, 310 is controlled through an electronic control unit depending on the present thermal and electrical needs. Such an electronic control unit works also on the amount of fuel to burn in the combustor 201a, 301a, in such a way as to avoid an excess of production of thermal and electrical energy compared with the current need.

According to an aspect of the invention, in addition to the by-pass valve 210, 310, the system 200, 300 includes also a variable-geometry turbine, which in turn is driven through the electronic control unit.

According to an aspect of the invention, the heat exchanger 202, is a fumes/air heat exchanger in the system 200, and a fumes/gaseous fluid in the system 300. The heat exchanger 202, 302 is configured to absorb at least 5% of the thermal energy of the fumes so that they pass through the main fumes/water exchanger 207, 307 at a temperature greater than or equal to 320° C.

Advantageously, the cogeneration system 200, 300 for a boiler according to the invention allows to use the cogeneration even in situations where the electric consumption with respect to fuel consumption (expressed in kWh) for heating is less than 30%, i.e.:

$$0.30 \geq (\text{electric kWh})/(\text{thermal kWh}).$$

Furthermore, advantageously, the cogeneration system 200, 300 can be applied to a condensing or conventional boiler, small or large, by making the appropriate changes.

BRIEF DESCRIPTION OF THE DRAWINGS

FIGS. 1 and 2 shows a first and a second embodiment of the cogeneration system 200 and 300 for a boiler comprising a boiler 201, 301 comprising a liquid or gaseous fuel combustor 201a, 301a, a fumes/air heat exchanger 202, 302 connected to the combustor 201a, 301a and a main fumes/water exchanger 207, 307 placed in series to the fumes/air exchanger 202, 302; a compressor 204, 304, for the compression of ambient air and for sending the same to the fumes/air exchanger 202, 302; and an external combustion open cycle gas turbine 203, 303, thermally supplied by the fumes/air exchanger 202, 302 and connected to the combustor 201a, 301a.

DETAILED DESCRIPTION OF THE DRAWINGS

Figure 1:
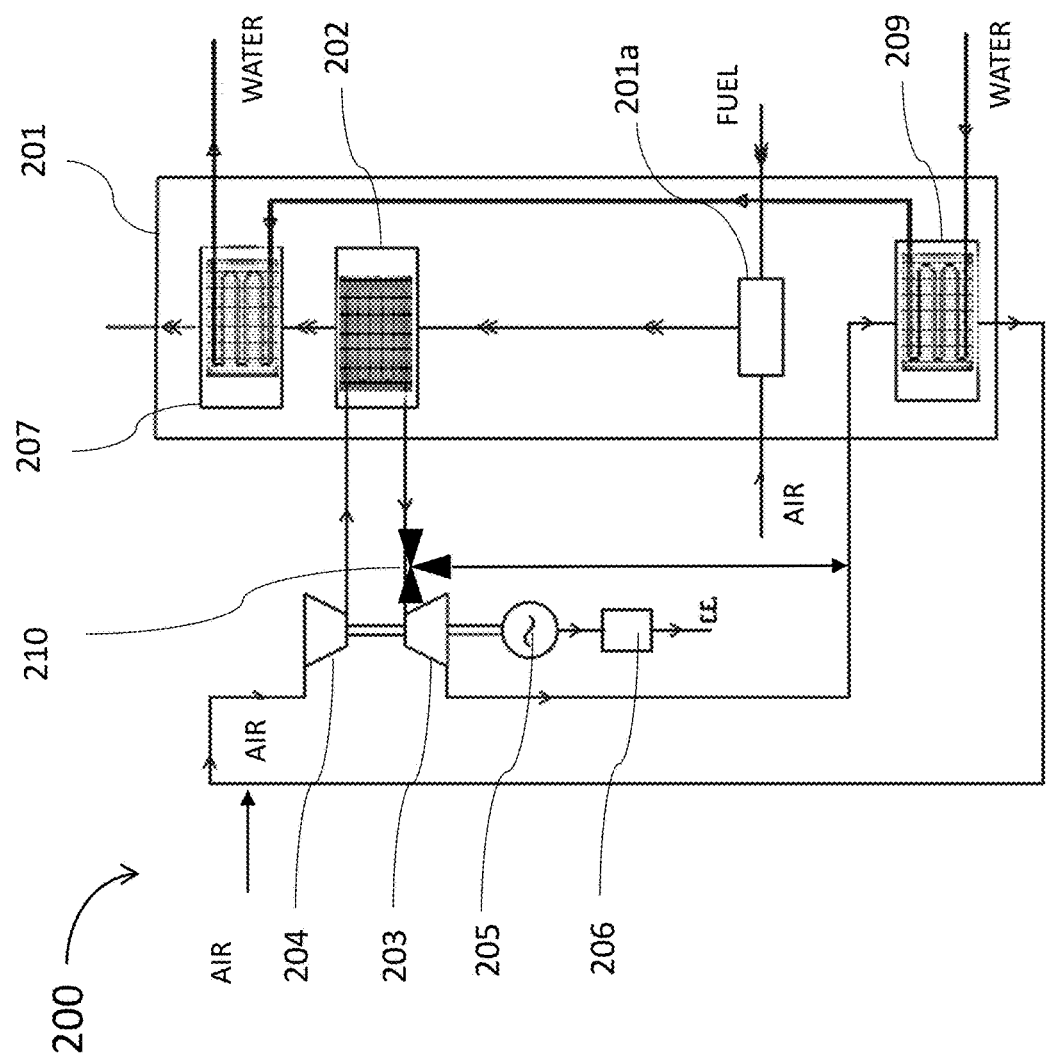

By placing the fumes/air exchanger 202, 302 inside the boiler, advantageously, the system 200, 300 absorbs a part of the thermal energy produced by combustion, converts it into electrical energy and recovers the part of the thermal energy lost in such a conversion.

For example, in an apartment where a domestic boiler is used, the ratio between electrical kWh and thermal kWh is ≤0.10, i.e., the average requirement of electrical energy in an apartment, in one year, is approximately equal to 10% of the requirement of gas used for heating (expressed in kWh). Therefore, under such conditions the fumes/air exchanger 202, 302 will absorb 10% of the thermal energy of the fumes, so that in the case of the boiler for domestic use, these will pass through the main fumes/water exchanger 207, 307 no more at 350° C., but at about 325° C.

Advantageously according to the invention, the main fumes/water exchanger 207, 307 is configured for heat recovery of the heat contained in the combustion fumes.

Advantageously according to the invention, a part of the thermal energy, preferably greater than 70% produced by the combustor 201a, 301a, not transferred to the fumes/air exchanger 202, 302, will be transferred, through the fumes, to the main fumes/water exchanger 207, 307 to heat water.

According to an aspect of the invention, the current generator 205, 305, generating continuous (DC) or alternating (AC) current, and the current converter 206, 306, whether it is a DC/DC, a DC/AC or an AC/AC converter, are able to produce electrical energy in compliance with the technical specifications of the electrical grid.

In use, the compressor 204, 304 compresses air taken from the environment and sends it to the fumes/air exchanger 202, 302 in which the air itself gets part of the thermal power generated by the combustor 201a, 301a in the boiler 201, 301. The air thus heated enters turbine 203, 303 where it expands, it generates energy that the generator 205, 305 (DC or AC) and the current converter 206, 306 will transform in electrical energy in compliance with the technical specifications of the electrical grid.

According to an aspect of the invention, the air coming out of the turbine 203, 303 is mixed with the combustion air in the boiler 201, 301.

Advantageously, the residual thermal energy of the air leaving the turbine 203, 303 is recovered increasing the temperature of the combustion air supplying the combustor 201a, 301a of the boiler 201, 301, by mixing, or directly into the boiler 201, 301 to facilitate the achievement of the high temperatures.

Advantageously, the system 200, 300 allows to achieve a production of mechanical energy by means of an open cycle gas turbine 203, 303 and, therefore, of electrical energy by means of the generator 205, 305 and the converter 206, 306, whose residual thermal power is recovered in the boiler together with the one present in the fluid that possibly has been redirected by the by-pass valve 210, 310. In this way the overall efficiency of the system 200, 300 remains similar to the thermal efficiency of a classic boiler, but with a contemporary production of electrical energy to be exploited.

Advantageously, the system 200, 300 produces electrical energy with percentages greater than 5% of the fed power, allowing the cogeneration even in situations where the thermal energy requirement (in the form of water or steam) and the electrical energy requirement is strongly unbalanced towards the first one.

Advantageously, keeping the overall efficiency fixed, it is possible to adjust both the amount of fuel to use and the part of production of electrical energy, by means of the by-pass valve 210, 310, in favor of the production of thermal energy making appropriate changes to the circulation of the air in the turbine, by means of the by-pass valve 210, 310 or not connecting the generator to the electrical grid.

The system 200, 300 includes an additional heat exchanger 209, 309 able to recover the residual thermal energy of the fluid coming out of the turbine 203, 303 and of the one possibly diverted by the by-pass valve 210, 310, and to preheat the water that is to be heated and that enters the main exchanger 207, 307.

In particular, the system 200 includes, an additional air/water heat exchanger 209 to which is connected the turbine 203 that in the system 200 is an external combustion closed cycle turbine 203. In this case, the air coming out of the turbine 203, mixing also with the air diverted by the by-pass valve 210, with its residual thermal energy, is provided to the air/water exchanger 209 where it gives away thermal energy directly to the water that is to be heated in the boiler.

Advantageously, the additional exchanger 209, 309 allows a preheating of the water and therefore a reduction in the waiting time for the water to reach the desired temperature when it comes out of the boiler. At the same time the air is cooled and brought to a temperature, which may also be lower than the ambient temperature, such as to be taken by the compressor 204. In this way the turbine cycle becomes a closed cycle having a global efficiency of the turbine/boiler unit close to the one of the first embodiment, with the advantage of a quicker water heating and of being able to use the air, in the turbine plant, with a minimum pressure higher than the atmospheric pressure so as to obtain smaller overall dimensions with the same output power or higher performances of the turbine and therefore a greater production of electrical energy (always remaining in the performance percentage range above indicated).

In use, in the system 200 the compressor 204 compresses the air and sends it to the heat exchanger 202 where the air gets a part of the thermal power produced by the combustor 201a in the boiler 201. The air heated in this way enters, with a flow adjusted by the by-pass valve 210, in the turbine 203 where it expands producing energy that the generator 205 (DC or AC) and the current converter 206 convert into electrical energy.

Figure 2:
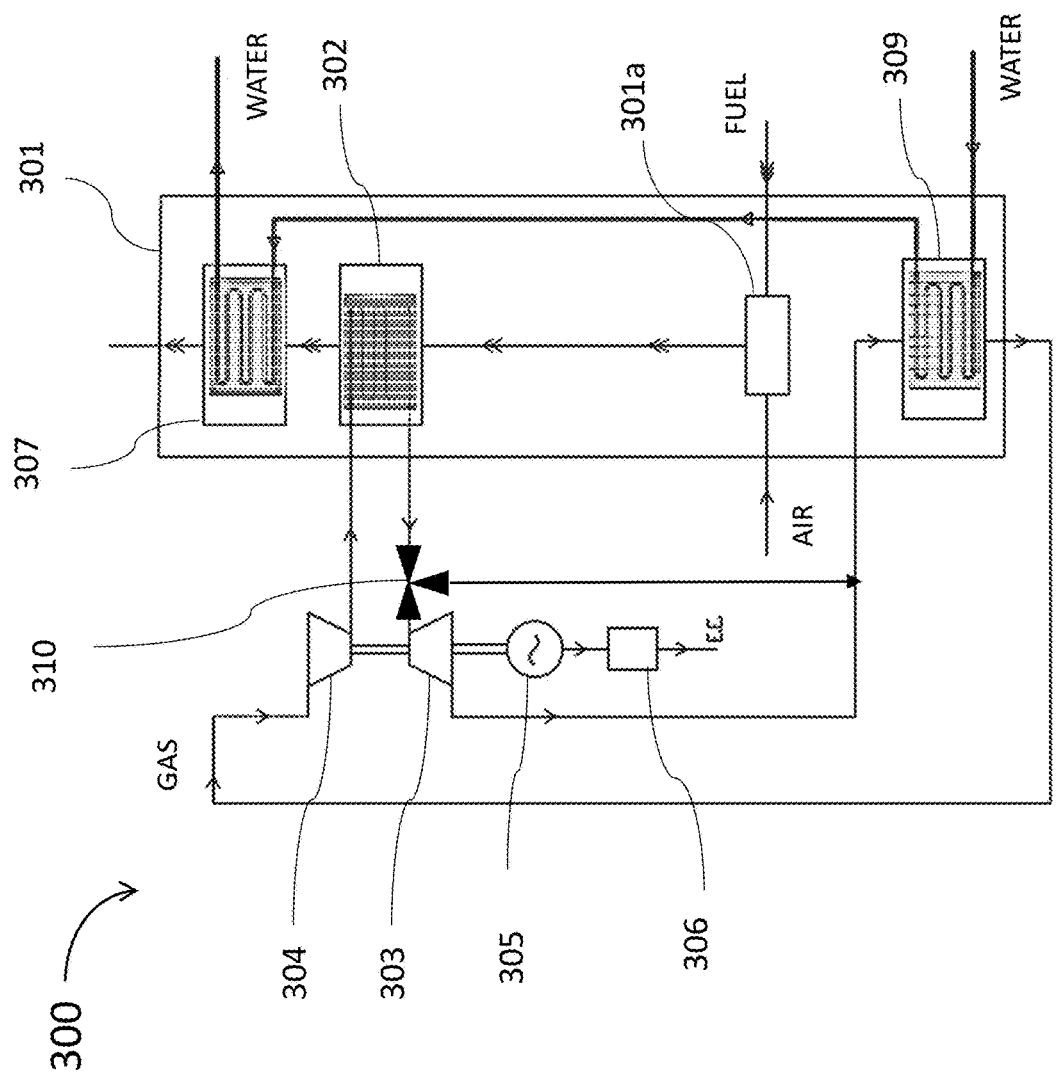

According to the second embodiment of the present invention, shown in FIG. 2, the compressor 304 is supplied with an inert gaseous fluid, instead of air, characterized by more efficient features compared with those of the air for the purposes of the function to be carried out.

According to an aspect of the invention, the gas turbine 303 is an external combustion closed cycle turbine connected to the combustor 301a, and the additional heat exchanger 309 is a gaseous fluid/water exchanger placed at the output of the turbine 303, so that the residual thermal energy is transmitted to the gaseous fluid/water exchanger 309.

Therefore, the cogeneration system 200, 300 for a boiler according to the invention allows a regulated preheating of the water and therefore a reduction in the waiting time for the water to reach the desired temperature when it comes out of the boiler.

Advantageously according to the invention, the system is characterized by emissions of exhaust gases similar to those of a boiler, therefore very low compared to those that occur with other systems producing electrical energy.

A further advantage of the system according to the invention is the constructive simplicity and the easy realization, with any size of power, and the possible diffusion in large scale.

A further advantage of the system according to the invention is a quicker water heating and being able to use an inert gas, due to the fact that at the same time the inert gas is cooled and brought to a temperature, that may be even lower than the room temperature, so as to be taken back by the compressor.

Another advantage of the cogeneration system for a boiler according to the invention is that it is smaller for the same produced power and has higher performances of the turbine, and thus an increased production of electrical energy.

It is finally clear that the cogeneration system for a boiler here described and illustrated may be subject to modifications and variations without thereby departing from the scope of the present invention, as defined in the appended claims.

The invention claimed is:

1. A cogeneration (200, 300) comprising:
  a boiler (201, 301) to heat water for domestic use;
  a combustor (201a, 301a) of liquid or gaseous fuel, placed into the boiler (201, 301) from which combustion fumes come out;
  a compressor (204, 304) for a gaseous fluid;
  a heat exchanger (202, 302) to exchange thermal energy between combustion fumes generated in the combustor (201a, 301a) and a fluid coming from the compressor (104, 204, 304);
  a gas turbine (203, 303) receiving the fluid compressed and heated from the heat exchanger (202, 302);
  a current generator (205, 305) and a current converter (206, 306) connected to the gas turbine (203, 303) to generate electrical energy;
  a main fumes/water exchanger (207, 307) placed after the heat exchanger (202, 302) to recover thermal energy between fumes generated in the combustor (201a, 301a) and water;
  a by-pass valve (210, 310) placed before the turbine (203, 303), configured to adjust the flow rate of a portion of fluid entering the gas turbine (203, 303) and the remaining flow of the fluid to be redirected;
  wherein in comprising an additional heat exchanger (209, 309) arranged to recover remaining thermal energy of the portion of the fluid sent out from the turbine (203, 3030) and of the remaining flow of the fluid redirected by the by-pass valve (210, 310) and arranged to preheat water entering in the main heat exchanger (207, 307).

2. Cogeneration system (200, 300) according to claim 1, wherein said by-pass valve (210, 310) being controlled in its opening and closing by said electronic control unit.

3. Cogeneration system (200, 300) according to claim 1, wherein the heat exchanger (202) is a fumes/gas exchanger configured to absorb at least 5% of the thermal energy of the fumes so that they pass through the main fumes/water exchanger (207, 307) at a temperature greater than or equal to 320° C.

* * * * *